March 19, 1957     F. GAUCHARD     2,785,768
APPARATUS FOR PRODUCING LIQUID SUSPENSIONS
FOR USE AS AEROSOLS
Filed March 29, 1952     2 Sheets-Sheet 1

March 19, 1957  F. GAUCHARD  2,785,768
APPARATUS FOR PRODUCING LIQUID SUSPENSIONS
FOR USE AS AEROSOLS
Filed March 29, 1952  2 Sheets-Sheet 2
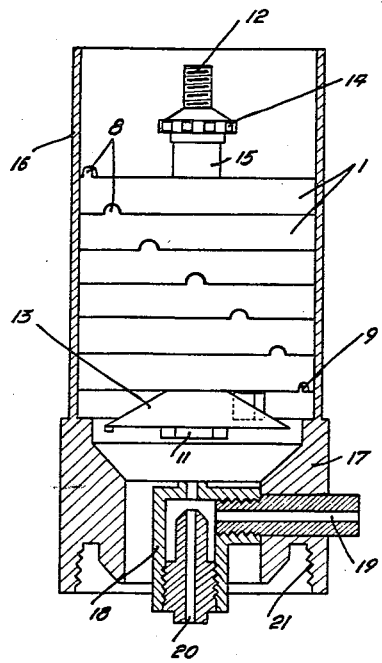
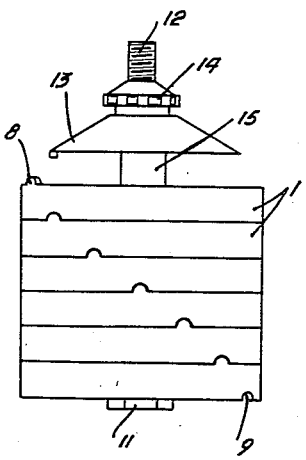
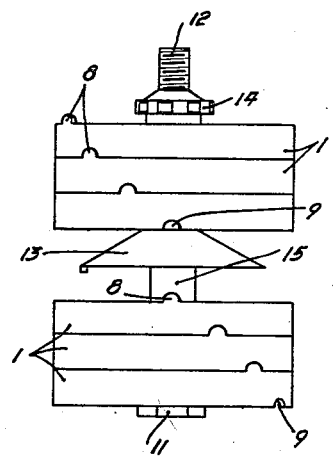
INVENTOR:
Fernand Gauchard
by Frank H. Wisch
Attorney in fact.

United States Patent Office 2,785,768
Patented Mar. 19, 1957

2,785,768

APPARATUS FOR PRODUCING LIQUID SUSPENSIONS FOR USE AS AEROSOLS

Fernand Gauchard, Santeny, France

Application March 29, 1952, Serial No. 279,437

3 Claims. (Cl. 183—70)

Aerosols are defined from a medical and technical standpoint as suspensions of solid or liquid particles the diameters of which range between 1 and 5 microns. Hitherto, it has appeared as exceedingly difficult to separate, inside a stream of gasiform fluid carrying a suspension of particles of different sizes obtained through the dynamic subdivision of a liquid jet, the actual aerosols from wetting microscopic mists. It has been attempted to produce the separation between these suspensions by means of filters housed inside the aerosol generators.

My invention has for its object filters, chiefly filters used in aerosol generators in order to remove from the suspension of particles the particles having the largest diameters so as to obtain a suspension of true aerosols; the chief characteristic of these improved filters consists in that they are constituted chiefly by a piling-up of identical surfaces provided with passages for the flow of gasiform fluid through said surfaces, said piling-up being executed with an angular shifting between the successive surfaces laid over one another, so as to provide for an angular shifting of the systems of passages extending through the different surfaces.

The filtering surfaces may be executed in conformity with the invention by means of perforated plates or sieves. According to a preferred embodiment, these filtering surfaces are formed by parallel wires or blades of a reduced breadth that are stretched inside a frame, which latter is provided with means for ensuring the angular shifting of the successive filtering surfaces with reference to one another.

In certain cases, it is of advantage to make the arrangement according to my invention play not only the part of a filter, but also that of particle-segmenting means in order to increase the yield of aerosols produced by the arrangement. To this end, the blades are provided with a sharp edge facing the incoming stream of gasiform fluid laden with the suspension to be purified.

With this arrangement, the larger particles are segmented through contact with the sharp edges of the filtering plate blades and are subdivided into smaller particles some of which may assume the required size.

According to a further feature of my invention, the filtering surfaces or plates are made preferably of dielectric material, chiefly plastic material. The impact and the friction of the particles in contact with said surfaces load said particles electrically which, by reason of the known repulsion of electric loads of same sign prevents, to a substantial extent, the mechanical condensation of the aerosols and provides a more homogeneous statistical distribution thereof.

It is possible also to modify the number of superposed filtering surfaces and/or their relative arrangement, chiefly by inserting between the latter impact surfaces and deflectors so as to provide for a substantial modification in the maximum size of the particles dispersed inside the stream of gasiform fluid.

I have thus obtained with the same filter, fine aerosols the particle size of which ranges between 1 and 5 microns, aerosols the particle size of which ranges between 3 and 5 microns, and mixtures of aerosols with microscopic mists, i. e. a dispersion in which the particle size ranges between 3 and 10 microns.

I will describe hereinafter a preferred embodiment of a filter according to my invention, reference being made to accompanying drawings, wherein:

Fig. 1 is a plan view of my improved filtering plate;

Fig. 2 is an elevational cross-section of the filter as seen in the direction of the arrows II—II of Fig. 1;

Fig. 3 is a cross-sectional view through line III—III of Fig. 1;

Fig. 4 is a cross-section on a larger scale through one of the blades incorporated in the filter;

Fig. 5 is an elevational view of the filter ready for operation;

Fig. 6 is a plan view of two superposed filtering plates;

Fig. 7 is a general vertical sectional view of the aerosol generator associated with the filtering plates;

Fig. 8 is a view similar to Fig. 5 with a somewhat different arrangement of the filters and associated deflector inside the generator;

Fig. 9 is also a view similar to Fig. 5 with a still further arrangement of the filters and deflectors inside the generator.

The filtering plate illustrated in Fig. 1 assumes a generally circular shape, this shape not being essential in the execution of the invention, as the frame of the filtering surface may assume as well a polygonal outline, the number of sides of which is selected as required.

The filtering plate illustrated includes a frame constituted by an outer ring 1 the height of which is about 10 mm. or thereabouts. At the center of the frame is mounted an inner ring 2 secured to the outer ring by means of a cross-shaped member 3. Inside the carrier frame thus constituted are laid blades 4 that are parallel with one another and that are reinforced by further auxiliary transverse blades 5. The cross-section of the blades 4 (Fig. 4) shows that they are each constituted by a body 6 the lower end of which forms a sharp ridge 7.

The outer frame ring 1 is provided at a point of its upper periphery with a stud 8 and at a point of its lower periphery with a similarly shaped notch 9, the angular distance between the stud and the notch being equal to say 20° or thereabouts.

As illustrated in Fig. 5, the complete filter includes a vertical spindle 10 resting on an enlarged lower end 11 while its upper end 12 is threaded. The spindle 10 passes through the registering inner rings 2 of the superposed filter plates in a manner such that the stud 8 of any filtering surface engages the notch 9 in the frame of the next overlying filtering surface.

By reason of this manner of piling up the filters, the blades 4 cross one another obliquely from one filter to the next, as clearly apparent from inspection of Fig. 6. The filtering system includes, furthermore, a deflector 13 illustrated in Fig. 5 as constituted by a downwardly flaring conical surface extending over the stream of gasiform fluid flowing upwardly towards the filter system, but said deflector may obviously assume any other suitable shape. Over the threaded upper end 12 of the rod 10 is screwed a nut 14 which urges downwardly the piled-up filtering surfaces through the agency of a ring 15. When the number of filtering surfaces in the system of piled-up filtering surfaces is modified, it is possible to change this ring 15 so as to compensate for the difference in height of the piled-up structure.

The complete aerosol generator is constituted by the superposed filters described hereinabove and located inside the casing or stack 16 (Fig. 7). Inside the lower and thicker portion 17 of said casing is fitted an atomizing apparatus of any suitable type.

In the case illustrated in Fig. 7, the arrangement includes an atomizing head 18 inside which compressed air or gas is admitted through the pipe 19 so as to carry along the liquid to be atomized that is admitted through the pipe 20. The lower supporting end 17 of the stack is, furthermore, tapped, as shown at 21, so as to allow it to be screwed over a vat containing the liquid to be atomized. The liquid jet passing out of the atomizing head 18 is projected against the wall of the deflector 13 the impact against which produces a mechanical subdivision of the suspended liquid particles; the latter pass then between the deflector and the inner wall of the casing and rise through the superposed filtering plates. The large diameter particles are subdivided as they impinge against the lower edges 7 of the blades 5 and the larger particles are gradually stopped and return through the casing stack into the vat. The diameters of the particles suspended in the aeriform stream passing out of the apparatus, range thus between 1 and 5 microns. The arrangement produces thus true aerosols, i. e. aerosols which correspond to the definition of aerosols as generally admitted by physicians.

The size of the particles varies in accordance with the number of filtering surfaces used and the higher limit of the range of diameters is lower when the number of filtering surfaces is larger. It is also possible to modify the lower and upper limits of the particle diameters by modifying the relative positions of the filtering surfaces and of the deflector.

It is possible, e. g. as illustrated in Fig. 8 to place the deflector at the upper end of the piled-up filtering surfaces. In this case, the yield of aerosols is larger, but the subdivision of the atomized particles is performed solely through segmentation over the ridges of the filter blades and consequently the lower limit of the diameter of the aerosol particles is slightly higher.

It is also possible as illustrated in Fig. 9 to set the deflector in a position separating the filtering plates into two sections, a number of filtering plates being located underneath the deflector and the remaining filtering plates above the latter. In this case, the segmentation is performed by the actual filters and also through impact on the deflectors.

This arrangement produces suspensions wherein the particle diameter ranges between 1 and 10 microns.

Obviously, although I have described and claimed the filter as standing upright, it is possible to use it in any position different from such an upright position.

What I claim is:

1. In apparatus for producing fine suspensions of liquid for use as aerosols for medicinal purposes, a chamber having means for subdividing droplets of an atomized liquid in suspension in a stream of gasiform fluid passing through said chamber, the said means consisting of stationary blades of dielectric material placed across the path of said stream, the said blades having sharp edges directed toward the oncoming stream and positioned for impingement of said droplets thereagainst and for providing an aerosol by segmentation of said droplets.

2. In apparatus for producing fine suspensions of liquid for use as aerosols for medicinal purposes, a chamber having means for subdividing droplets of an atomized liquid in suspension in a stream of gasiform fluid passing through said chamber, the said means consisting of a plurality of superposed sets of stationary blades of dielectric material placed across the path of said stream, the said blades in said sets having sharp edges directed toward the oncoming stream and positioned for impingement of said droplets thereagainst and for providing an aerosol by segmentation of said droplets, and means for fixing the position of said edges of the blades in a set at a predetermined angle to the said edges of the blades in a next adjacent set.

3. In apparatus for producing fine suspensions of liquid for use as aerosols for medicinal purposes, a chamber having means for subdividing droplets of an atomized liquid in suspension in a stream of gasiform fluid passing through said chamber, the said means consisting of a plurality of superposed sets of stationary blades of dielectric material placed across the path of said stream, the said blades in said sets having sharp edges directed toward the oncoming stream and positioned for impingement of said droplets thereagainst and for providing an aerosol by segmentation of said droplets, the blades in each of said sets being supported by a rim, the rims of said sets coinciding to form the side wall of said chamber, and the rim of each set having a lug that fits into a notch in the rim of an adjacent set for fixing the position of said sharp edges of the blades of a set at a predetermined angle to the said edges of the blades in a next adjacent set.

References Cited in the file of this patent

UNITED STATES PATENTS

| 165,141 | White | June 29, 1875 |
| 758,789 | Slining | May 3, 1904 |
| 862,720 | Day | Aug. 6, 1907 |
| 1,016,741 | Fritz | Feb. 6, 1912 |
| 1,156,511 | Wood | Oct. 12, 1915 |
| 1,572,245 | Quinn | Feb. 9, 1926 |
| 1,624,689 | Sweetland | Apr. 12, 1927 |
| 1,760,705 | Ludlam | May 27, 1930 |
| 2,078,558 | Borell | Apr. 27, 1937 |
| 2,619,188 | Haw et al. | Nov. 25, 1952 |

FOREIGN PATENTS

| 419,520 | Germany | Oct. 1, 1925 |
| 421,186 | France | Dec. 10, 1910 |
| 476,372 | Great Britain | Dec. 7, 1937 |